(12) United States Patent
Iseri et al.

(10) Patent No.: US 8,131,025 B2
(45) Date of Patent: Mar. 6, 2012

(54) FINGERPRINT DETECTION APPARATUS

(75) Inventors: Yoichi Iseri, Fukuoka (JP); Yoshinori Tahara, Fukuoka (JP); Kenichirou Nagashita, Fukuoka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 1037 days.

(21) Appl. No.: 11/778,769

(22) Filed: Jul. 17, 2007

(65) Prior Publication Data

US 2008/0049989 A1    Feb. 28, 2008

(30) Foreign Application Priority Data

Aug. 24, 2006    (JP) ................................. 2006-228168

(51) Int. Cl.
*G06K 9/00*    (2006.01)
(52) U.S. Cl. ...... 382/124; 340/5.53; 340/5.83; 713/186; 902/3

(58) Field of Classification Search ............... 382/124, 382/125–127; 283/68, 69, 78; 340/5.1, 5.2, 340/5.52, 5.53, 5.8–5.86; 356/71; 713/186; 902/3
See application file for complete search history.

(56) References Cited

U.S. PATENT DOCUMENTS

| | | | | |
|---|---|---|---|---|
| 5,726,443 | A | * | 3/1998 | Immega et al. ............ 250/227.2 |
| 5,781,651 | A | | 7/1998 | Hsiao et al. |
| 6,628,377 | B1 | | 9/2003 | Sabatini et al. |

FOREIGN PATENT DOCUMENTS

| | | |
|---|---|---|
| EP | 1610210 | 12/2005 |
| JP | 2004-021471 | 1/2004 |
| JP | 2005-202694 | 7/2005 |
| WO | WO97/26752 | 7/1997 |

* cited by examiner

*Primary Examiner* — Aaron W Carter
(74) *Attorney, Agent, or Firm* — Ladas & Parry LLP

(57) ABSTRACT

A fingerprint detection apparatus for obtaining an image of a fingerprint of a finger by using a light source for emitting a light to the finger and an image obtaining part for outputting electric signals in correspondence with received light is disclosed. The fingerprint detection apparatus includes a system controller for determining whether the finger is in contact with or in the vicinity of the image obtaining part by comparing a threshold with a difference between a value of the electric signal when the light source is lit and a value of the electric signal when the light source is not lit.

4 Claims, 8 Drawing Sheets

FINGERPRINT DETECTION APPARATUS

BACKGROUND OF THE INVENTION

1. Field of the Invention

The present invention generally relates to a fingerprint detection apparatus, and more particularly to a fingerprint detection apparatus including a light source for irradiating light to a finger and an image detecting part for detecting an image of a fingerprint for detecting a fingerprint based on a detection signal output from the image detecting part.

2. Description of the Related Art

Among various typical fingerprint detection apparatuses, there is, for example, one fingerprint detection apparatus that obtains images of fingerprints by activating a fingerprint detection apparatus using software that controls a system for reducing power consumption, and another fingerprint detection apparatus that obtains images of fingerprints by activating software upon detecting a finger contacting the fingerprint detection apparatus. From the aspect of operability and low power consumption, the latter may be chosen more often in a case of a battery operated system.

As for a detecting part for detecting a finger contacting an image pickup surface, an optical type fingerprint detection apparatus may have, for example, an electromagnetic detecting part that detects changes of resistance or capacitance. Alternatively, the optical type fingerprint detection apparatus may have an optical detecting part that is mounted outside of the fingerprint detection apparatus. However, such detecting parts exhibit difficulty in operating consistently due to, for example, the condition of a finger (moist finger, dry finger) or climate. Furthermore, since the resistance change detection type or the capacitance change detection type has an electrode provided to its finger-contact area, static electricity having greater energy than the electrode may be applied to the detection apparatus due to discharge of static electricity created from chemical fiber clothing of the user, thereby damaging the electronic circuits inside the detection apparatus.

In a case of using the optical type fingerprint detection apparatus having an optical detecting part mounted outside of the detection apparatus, the detecting part may be adversely affected by factors such as surrounding brightness or disturbance by sunlight. Such a type of apparatus is required to detect concavo/convexo parts of a fingerprint image obtained when contacting a finger under various atmospheric conditions (for example, see Japanese Laid-Open Patent Application No. 2005-202694).

Furthermore, such an optical type fingerprint detection apparatus is difficult to use for a battery-operated apparatus such as a mobile phone since its light source is required to be lit up when performing fingerprint detection.

Although it is possible to realize a fingerprint detecting function by modifying the configuration or the detection algorithm of the optical type fingerprint detection apparatus, additional components are often required for attaining a satisfactory fingerprint detecting function. This leads to increase of manufacturing cost of the apparatus. Furthermore, with the type that detects concavo/convexo parts of a fingerprint image, there are significant differences in reference values for determining detection of a fingerprint according to the atmospheric conditions (e.g., outdoors in daylight, nighttime).

SUMMARY OF THE INVENTION

The present invention may provide a fingerprint detection apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a fingerprint detection apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a fingerprint detection apparatus for obtaining an image of a fingerprint of a finger by using a light source for emitting a light to the finger and an image obtaining part for outputting electric signals in correspondence with received light, the fingerprint detection apparatus including: a system controller for determining whether the finger is in contact with or in the vicinity of the image obtaining part by comparing a threshold with a difference between a value of the electric signal when the light source is lit and a value of the electric signal when the light source is not lit.

In the fingerprint detection apparatus according to an embodiment of the present invention, the image obtaining part may include an image guide for guiding the received light and an image sensor for detecting the light guided from the image guide.

In the fingerprint detection apparatus according to an embodiment of the present invention, the system controller may intermittently determine whether the finger is in contact with or in the vicinity of the image obtaining part.

In the fingerprint detection apparatus according to an embodiment of the present invention, the system controller may switch from a finger detection mode to a fingerprint image obtaining mode when determining that the finger is in contact with or in the vicinity of the image obtaining part.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
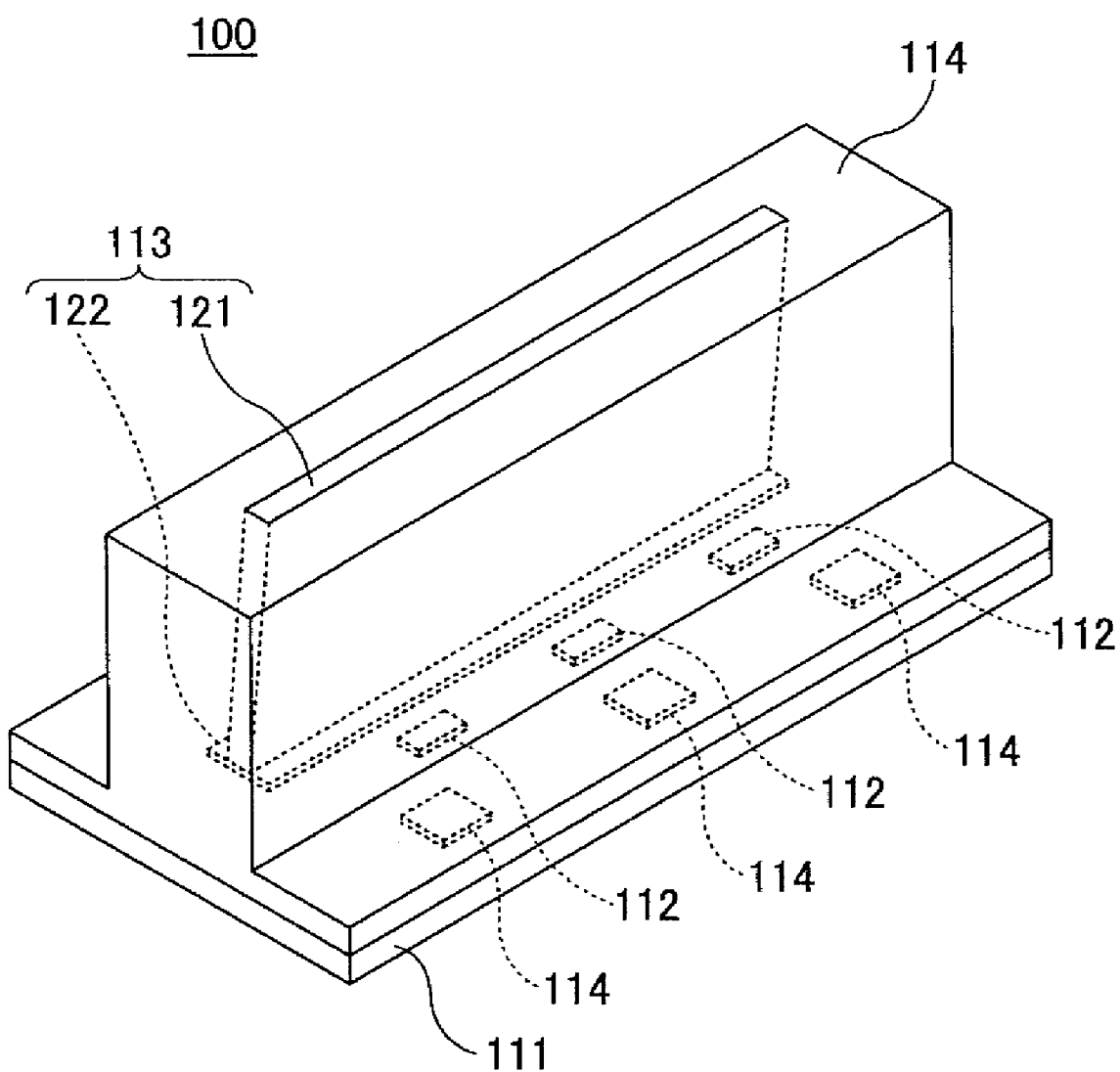
FIG. 1 is a perspective view showing a fingerprint detection apparatus according to an embodiment of the present invention.
Figure 2:
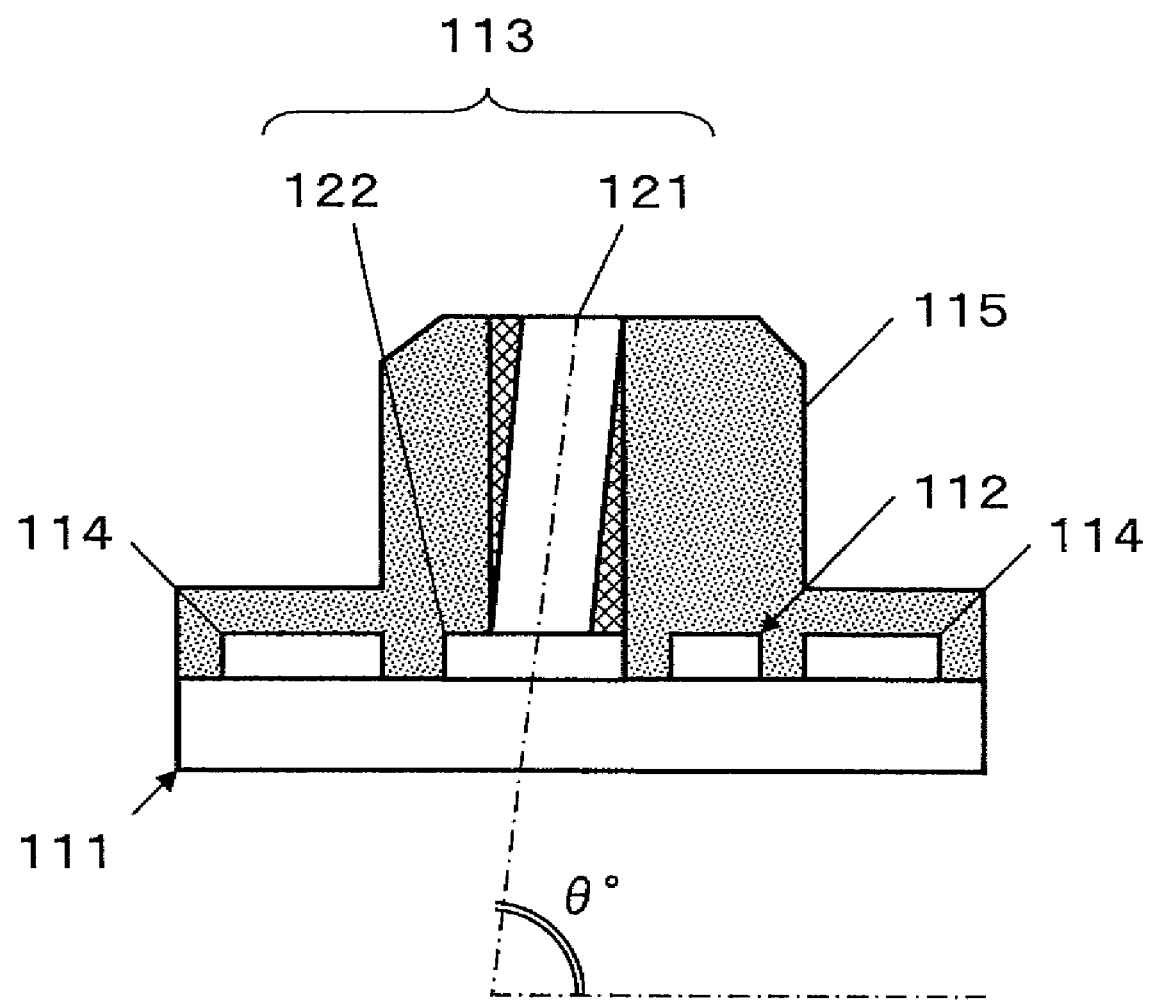
FIG. 2 is a cross-sectional view of the fingerprint detection apparatus according to an embodiment of the present invention.
Figure 3:
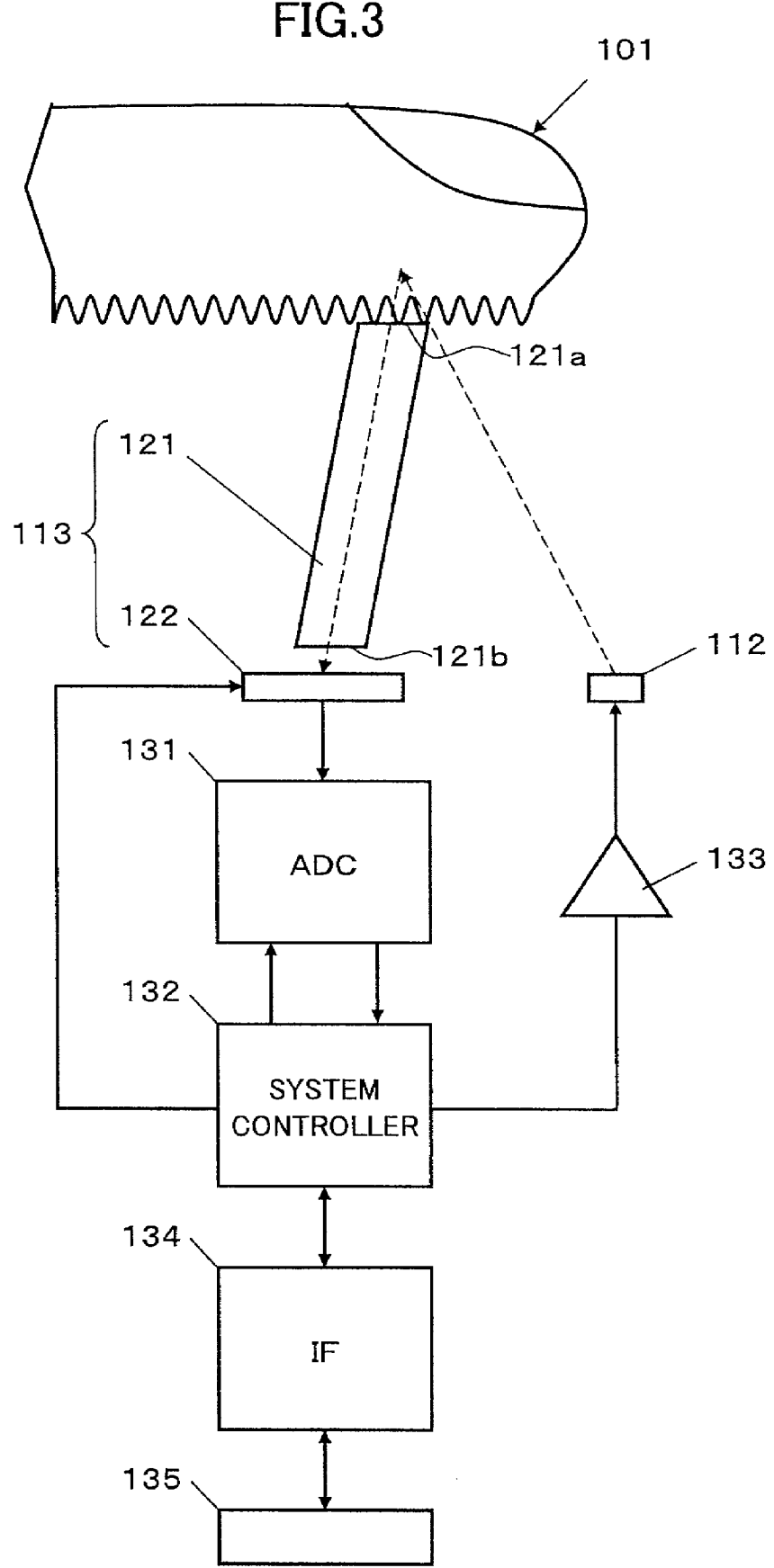
FIG. 3 is a schematic diagram for describing operation of a fingerprint detection apparatus according to an embodiment of the present invention.

FIG. 1 is a perspective view showing a fingerprint detection apparatus 100 according to an embodiment of the present invention. FIG. 2 is a cross-sectional view of the fingerprint detection apparatus 100 according to an embodiment of the present invention. FIG. 3 is a schematic diagram for describing the operation of the fingerprint detection apparatus 100 according to an embodiment of the present invention.

The fingerprint detection apparatus 100 has a circuit board 111 on which one or more light emitting diodes 112, an image obtaining part 113, and various electronic devices 114 are mounted and sealed with a sealing resin 115. The fingerprint detection apparatus 100 uses the light emitting diodes 112 (which are lit mainly for detecting a fingerprint of a finger 101) and the image obtaining part 113 to conducting a finger detection operation (hereinafter also referred to as "finger contact detection operation"). The finger detection operation according to an embodiment of the present invention includes an operation of detecting a finger being in contact with the image obtaining part 113 and an operation of detecting a finger being in the vicinity of the image obtaining part. When a finger 101 is detected, a fingerprint detection operation (fingerprint image obtaining operation) is conducted by the image obtaining part 113. The data of the detected fingerprint are output to an upper level apparatus. Therefore, the fingerprint detection apparatus 100 according to an embodiment of the present invention requires no other additional components for performing a finger detection operation. That is, with the fingerprint detection apparatus 100 according to an embodiment of the present invention, finger detection can be achieved by simply changing the control system.

The light emitting diode 112, which is driven by a driver 133, emits light onto a finger 101 via the sealing resin 115. Although this embodiment uses a light transmitting resin as the sealing resin 115 for allowing light from the light emitting diode 112 to transmit through, a resin material that blocks light may alternatively be used as the sealing resin 115. In this case, a block(s) of light transmitting resin may be embedded in the sealing resin 115 at an area between the light emitting diode 112 and a ceiling plane of the sealing resin 115. The light incident on the finger 101 diffuses in the finger and is directed to the image obtaining part 113.

The image obtaining part 113 includes an image guide 121 and an image sensor 122. The image guide 121 includes plural optical fibers gathered and attached together. The image guide 121 having such a configuration is tilted to an angle of θ degrees with respect to the circuit board 111. The planes on both ends (end planes) of the circuit board 111 are diced and polished so that end planes become parallel to the circuit board 111. The light, which is incident on one end plane of the image guide 121 (hereinafter also referred to as "first end plane 121a") from an object having low refractive index (e.g., air), is not guided to the other end plane of the image guide 121 (hereinafter also referred to as "second end plane 121b"), but is instead reflected from the first end plane 121a. The light, which is incident on the first end plane 121a from an object having high refractive index (e.g., finger 101), enters the optical fibers of the image guide 121, is guided to the second end plane 121b, and transmitted from the second end plane 121b. Accordingly, the light from the valley points of the fingerprint is not guided to the second end plane 121b. The light from the ridge points of the fingerprint is guided to the second end plane 121b and transmitted from the second plane 121b. Although the image guide 121 according to this embodiment of the present invention is tilted toward the lateral direction of the image sensor 122, the image guide 121 may be tilted toward the longitudinal direction of the image sensor 122.

Figure 4:
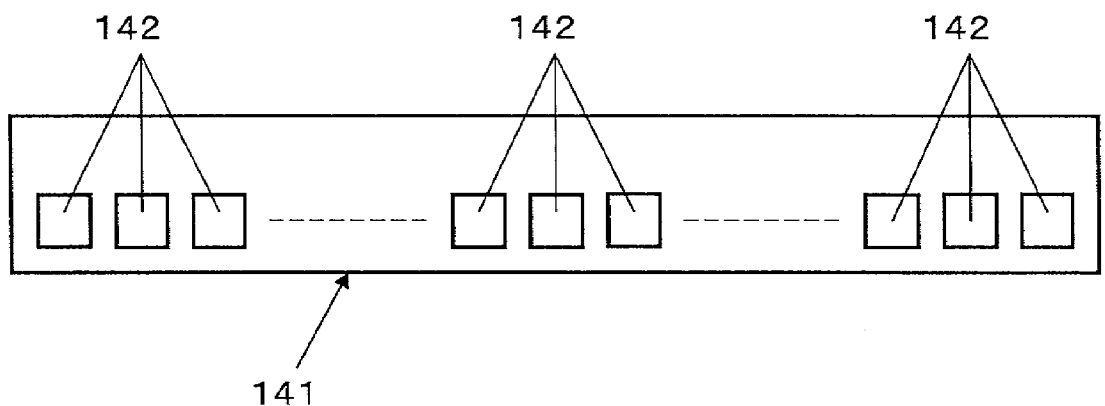
FIG. 4 is a plane view of an image sensor according to an embodiment of the present invention.

FIG. 4 is a plane view of the image sensor 122 according to an embodiment of the present invention.

The image sensor 122 has one or more imaging devices 142 arranged in a line on a semiconductor substrate 141. The image guide 121 and the image sensor 122 are positioned so that the direction in which the imaging devices 142 are arranged is in a manner substantially matching the longitudinal direction of the image guide 121.

It is to be noted that, although the imaging devices 142 according to this embodiment of the present invention are arranged in a single line, the imaging devices 142 may be arranged in plural lines. Furthermore, neighboring (adjacent) imaging devices 142 may be positioned in a zigzag formation. With reference to FIG. 3, a system controller 132 controls operations of the image sensor 122 by generating sensor control signals and supplying the sensor control signals to the image sensor 122. In accordance with the sensor control signals from the system controller 132, the image sensor 122 converts the light transmitted from the second end plane 121b of the image guide 121 into electric signals (charges). The image sensor 122 supplies the converted electric signals as analog image signals to an analog/digital converter (ADC) 131.

The analog image signals supplied from the image sensor 122 are converted into digital data (e.g., 8 bit digital data having 256 tones, 4 bit digital data having 16 tones) by the analog/digital converter 131. The digital data converted by the analog/digital converter 131 are supplied to the system controller 132.

The system controller 132 processes (data processing) the digital data supplied from the analog/digital converter 131 and supplies the processed digital data to an interface circuit (IF) 134. The interface circuit 134 is connected to a host system (not shown) via a connector 135 for transferring the digital data processed by the system controller 132 to the host system. It is to be noted that the connector 135 may be, for example, a BGA (Ball Grid Array) socket terminal often used in packaged integrated circuits or a solder connector such as lead frame terminal.

It is to be noted that, other than generating sensor control signals and supplying the generated sensor control signals to the image sensor 122, the system controller 132 generates ADC control signals and supplies the generated ADC control signals to the analog/digital converter 131 for controlling operations of the analog/digital converter 131. Furthermore, the system controller 132 generates light control signals and supplies the generated light control signals to the driver 133 for driving and controlling the light emitting diodes 112.

The system controller 132 in this embodiment of the present invention has two modes for operating (operation mode). For example, one operation mode is a fingerprint image obtaining mode for enabling the image obtaining part 113 to obtain an image of a fingerprint of a finger and the other operation mode is a finger detecting (finger contacting detecting) mode for enabling the image obtaining part to detect a finger being in contact with or in the vicinity of the image obtaining part 113. The system controller 132 may also have a complete system stop mode.

The power consumption of the system controller 132 is substantially proportional to its clock (operating clock) and circuit scale. For example, in a case of operating in a finger contact detecting mode where low power consumption is desired, the system controller 132 is desired to operate with few circuits for reducing the clocks.

Therefore, in a case where finger contact is detected, a signal indicating the detection is used for switching the operation mode of the system controller 132. Alternatively, the signal may be used for communicating with the host system and allow the host system to control the system controller 132.

Next, a relationship between the timing for storing images and the timing for outputting image data is described.

First, the image sensor 122 is described with reference to FIG. 5.

Figure 5:
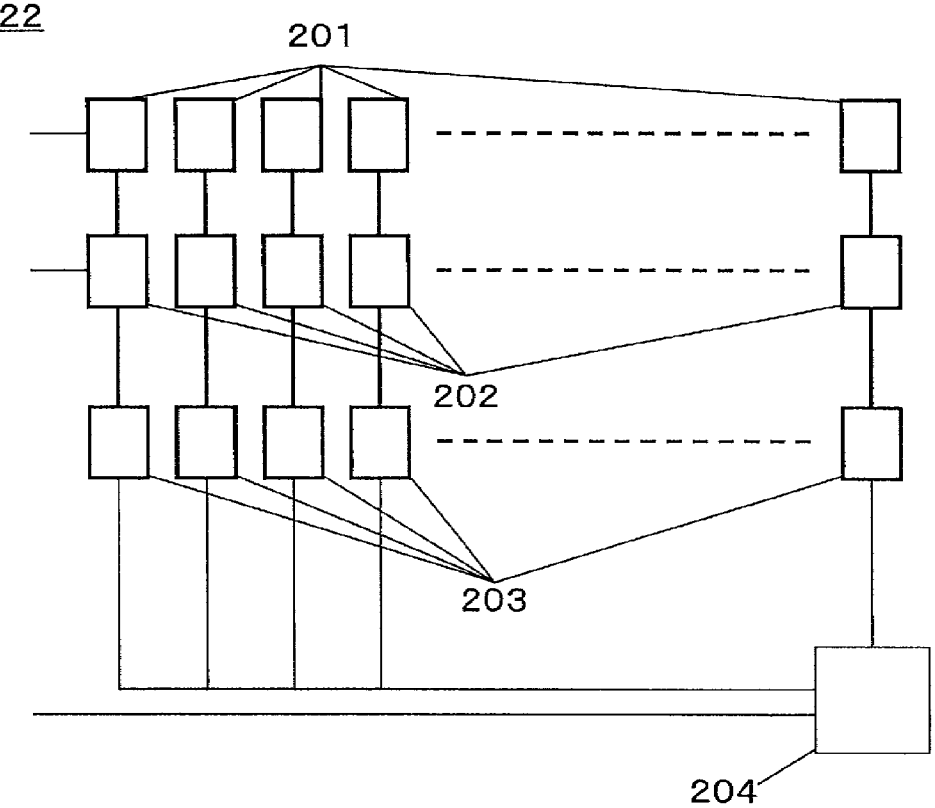
FIG. 5 is a block diagram of an image sensor according to an embodiment of the present invention.

FIG. 5 is a block diagram of the image sensor 122 according to an embodiment of the present invention.

As shown in FIG. 5, the image sensor 122 in this embodiment of the present invention includes an array of photodiodes 201 (photodiode array), an array of image transfer switches (image hold switches) 202 (image transfer switch array (image hold switch array)), an array of image storage devices 203 (image storage device array), and an image transfer interface 204.

The photodiode array 201 is connected to the image storage device array 203 via the image transfer switch array 202. The image data stored in the image storage devices 203 are extracted from outside of the image sensor 122 via the image transfer interface 204. The electric charges stored in the photodiode array 201 by photoelectric conversion are transferred to the image storage device array 203 via the image transfer switch array 202 in accordance with image hold signals transmitted to the image transfer switch array 202 from the system controller 132.

Then, the transferred charges are extracted from outside of the image sensor 122 via the image transfer interface 204 in accordance with image transfer clocks from the system controller 132.

Figure 6:
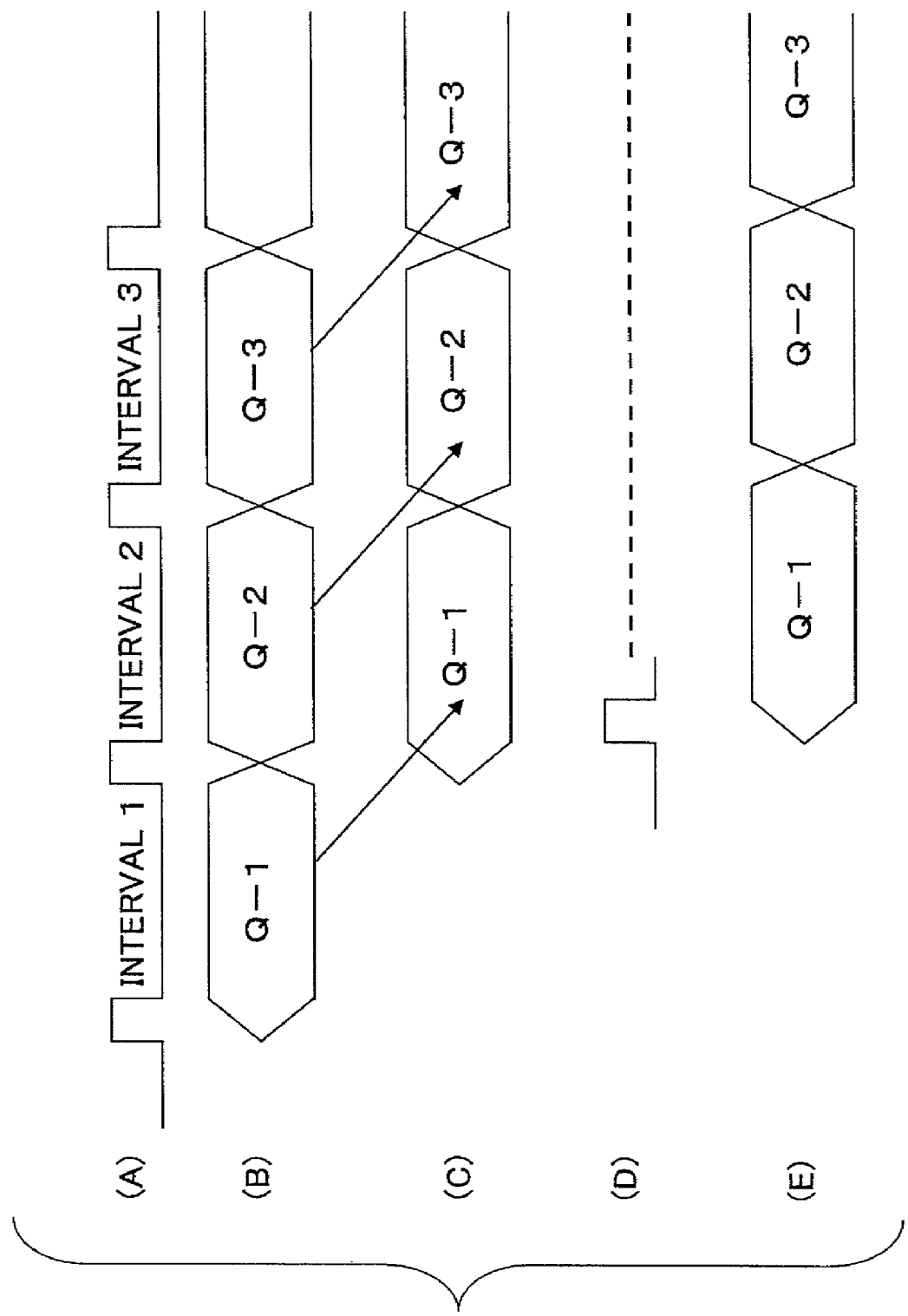
FIG. 6 is a schematic diagram for describing operations of an image sensor according to an embodiment of the present invention.
Figure 7:
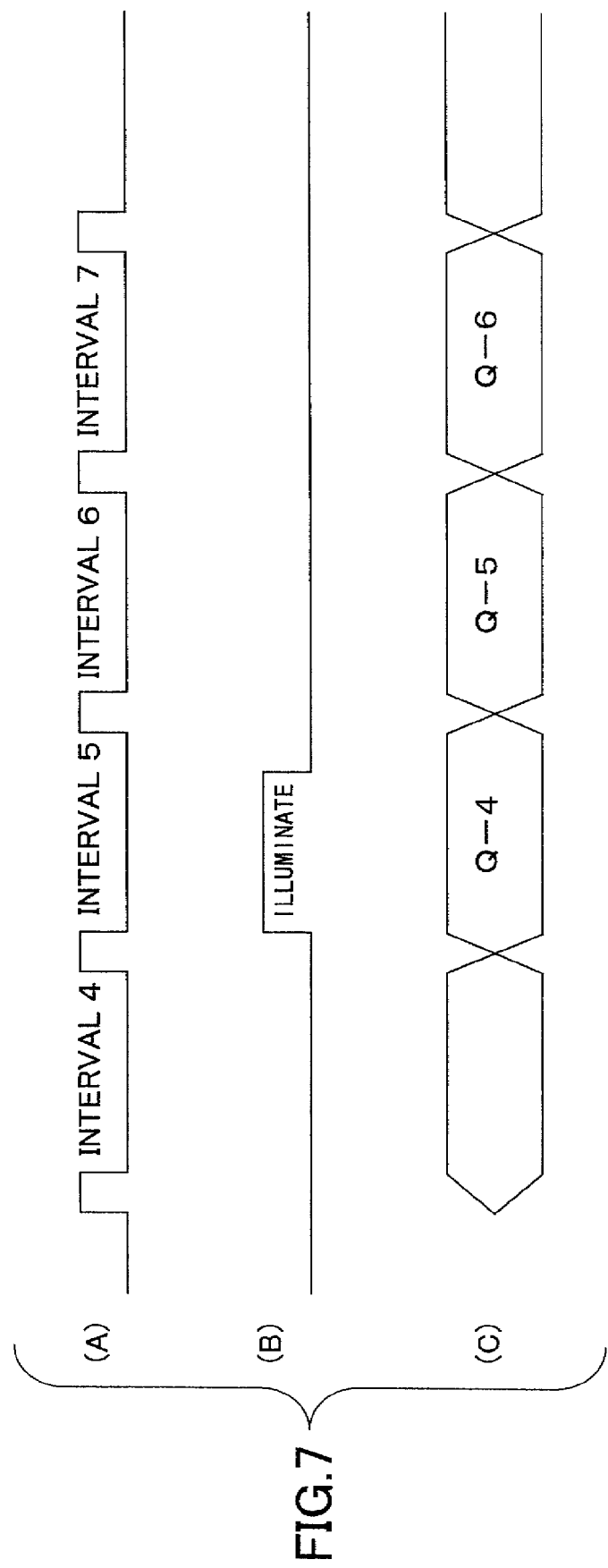
FIG. 7 is a schematic diagram for describing operations of an image sensor according to an embodiment of the present invention.

FIGS. 6 and 7 are schematic diagrams for describing operations of the image sensor 122 according to an embodiment of the present invention. It is to be noted that FIGS. 6(A) and 7(A) indicate an image hold signal, FIG. 6(B) indicates a charge stored in the image sensor 122, FIG. 6(C) indicates a charge stored in the image storage device 203, FIG. 6(D) indicates an image transfer clock, FIGS. 6(E) and 7(C) indicate an output signal, and FIG. 7(B) indicates an LED control signal.

In the interval 1 of the image hold signal 205 of FIG. 6(A), a charge Q-1 stored in the photodiode array 201 is transferred to the image storage device array 203 with an image hold signal between the interval 1 and interval 2 as shown in FIG. 6(A). The transferred charge Q-1 is then transferred outside of the image sensor 122 during interval 2 by the image transfer clock as shown in FIG. 6(D).

The light emitting diode 112 is lit on when an LED control signal of FIG. 7(B) indicating "ON" is output in the interval 5 of FIG. 7(A). In this interval, the charge stored in the photodiode array 201 in the interval 4 is output as a voltage proportional to the amount of charge with the output signal output in the interval 5 as shown in FIG. 7(C). The image signal output in this interval serves as background data when the light emitting diode 112 is not lit. The data output in the interval 6 are image data stored in the interval 5 and serve as image data when the light emitting diode 112 is lit.

Figure 8:
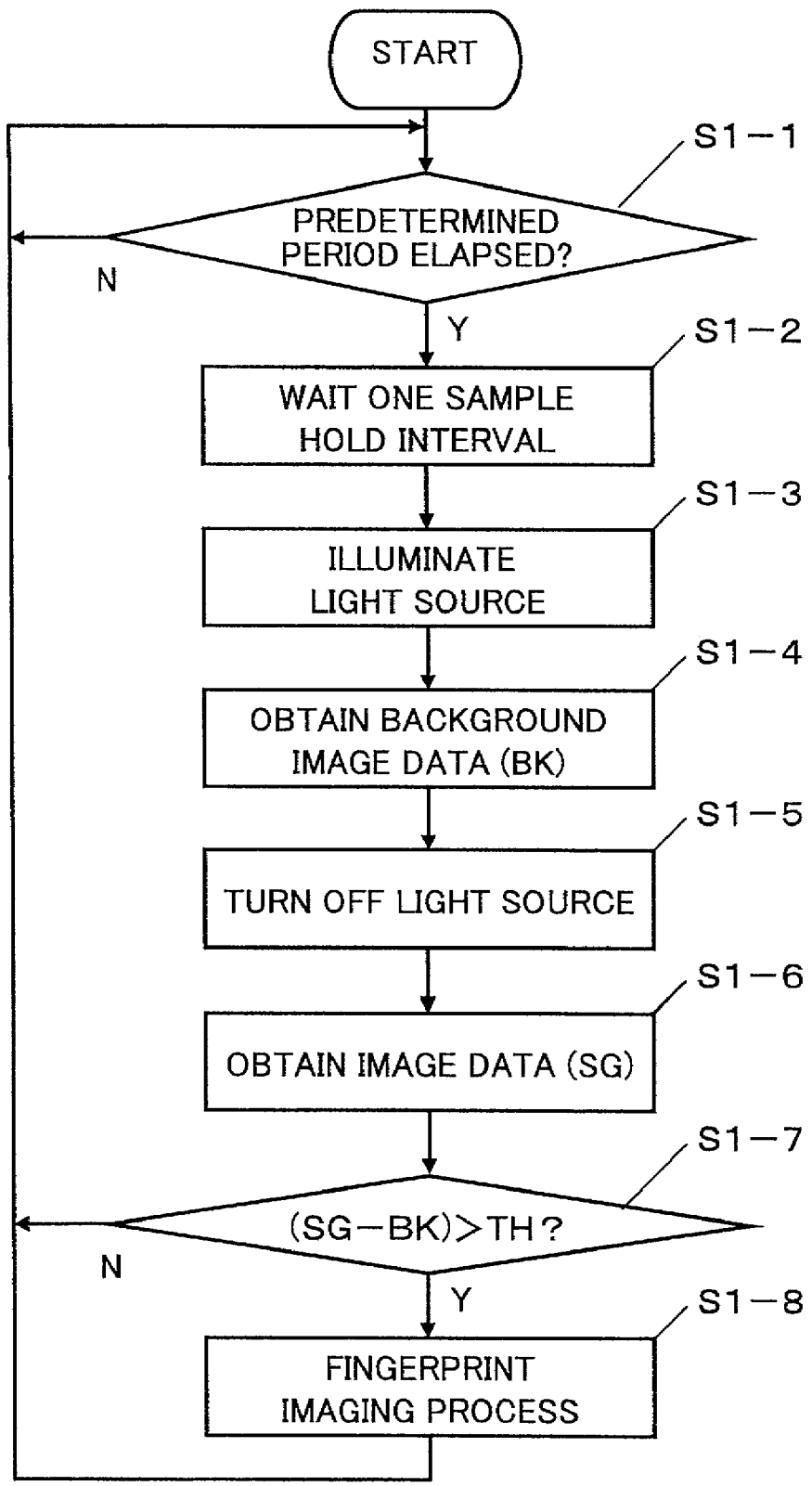
FIG. 8 is a flowchart showing an operation of a system controller during finger contact detection according to an embodiment of the present invention.

FIG. 8 is a flowchart showing an operation of the system controller 132 during finger contact detection according to an embodiment of the present invention.

After a predetermined period elapses (Step S1-1), the system controller 132 outputs an image hold signal in synchronization with a fingerprint detection pulse generated therein and waits until the next image hold signal (Step S1-2).

Then, the system controller 132 controls the driver 133 in synchronization with the image hold signal and lights (illuminate) the light emitting diode 112 (Step S1-3). Then, the system controller 132 reads an image and obtains digital data of the read out image by controlling the image sensor 122 and the analog/digital converter 131 (Step S1-4). In this step, the obtained digital data are background image data BK obtained by the imaging devices 142 positioned in the center or areas surrounding the center. The obtained image data in this step are image data obtained when the light emitting diode 112 is turned off.

It is to be noted that, in obtaining image data of the imaging devices 142 positioned in the center or areas surrounding the center, it is required that a finger be placed at the center of the imaging devices 142 for correctly obtaining a fingerprint image. Thus, satisfactory performance can be attained by simply detecting a center of a finger that first contacts the imaging device 142 at the center in a case where the finger is correctly placed.

Although a single pixel is basically enough in obtaining a pixel(s) of image data during finger detection, an added value or average value of the data of plural pixels (e.g., 2 pixels, 4 pixels, or 8 pixels) may be used for noise removal. The pixels used for noise removal in this example are powers of two for simplifying the arithmetic circuit. Therefore, the pixels do not need to be powers of two depending on the circuit. It is however preferable to perform detection by using a small number of pixels for reducing power consumption.

After or during the obtaining of the background image data BK, the system controller 132 turns off the light emitting diode 112 by controlling the driver 133 (Step S1-5). The light emitting diode 112 is lit for a predetermined period. Then, the system controller 132, in synchronization with the image hold signal, reads an image and obtains digital data of the read out image by controlling the image sensor 122 and the analog/digital converter 131 (Step S1-6). For example, the obtained digital data are image data SG obtained by the imaging devices 142 positioned in the center or areas surrounding the center.

Then, the system controller 132 detects finger contact by determining whether (SG−BK) is greater than a threshold TH (Step S1-7). In a case where data of 256 tones is used, the threshold value may range from, for example, 10 to 100. In a case where the threshold value is low, the sensitivity for finger contact detection is high, and malfunction with respect to light disturbance (e.g., sunlight) tends to easily occur. In a case where the threshold value is high, the sensitivity for finger contact detection is low, and malfunction with respect to light disturbance hardly occurs. Accordingly, it is desired to set the value according to the environment in which the fingerprint detection apparatus is used.

In a case where (SG−BK) is greater than the threshold TH (Yes in Step S1-7), the amount of light guided to the second end plane 121b of the image guide 121 increases when a finger is in contact with or in the vicinity of the first end plane 121a of the image guide 121. Accordingly, the system controller 132 determines detection of a finger being in contact with or in the vicinity of the first plane 121a of the image guide 121, to thereby initiate a fingerprint imaging process (fingerprint image obtaining process) (Step S1-8).

In a case where (SG−BK) is less than the threshold TH (No in Step S1-7), there is little difference (change) between the image data SG and the background data BK. Accordingly, the system controller 132 determines no detection of a finger being in contact with or in the vicinity of the first plane 121a of the image guide 121, to thereby return to Step S1-1 and continue the operation.

Figure 9:
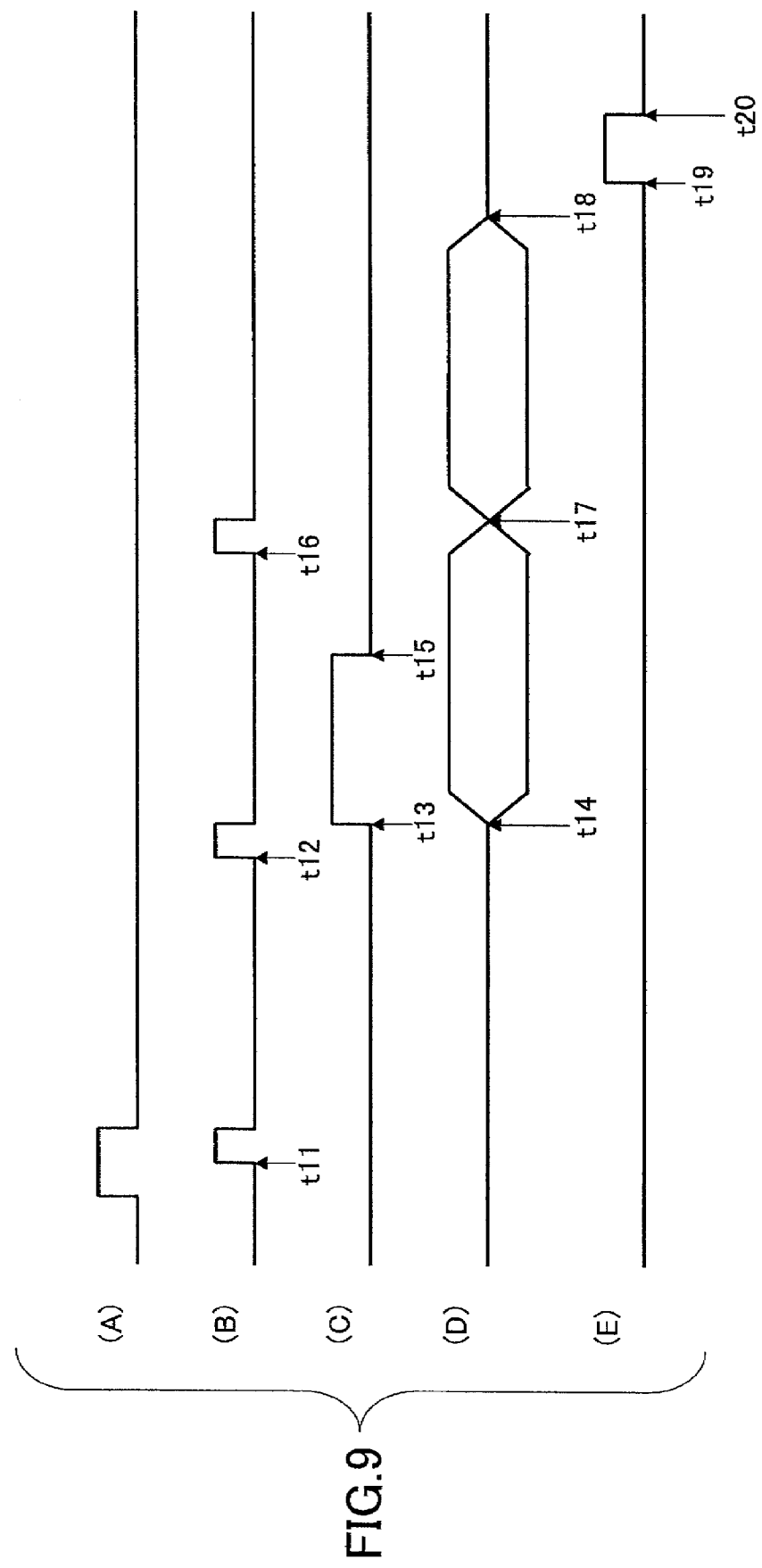
FIG. 9 is a timing chart during fingerprint detection according to an embodiment of the present invention.

FIG. 9 is a timing chart during fingerprint detection according to an embodiment of the present invention. FIG. 9(A) indicates a fingerprint detection pulse, FIG. 9(B) indicates an image hold signal, FIG. 9(C) indicates an illumination control signal, FIG. 9(D) indicates a data transfer timing, and FIG. 9(E) indicates a finger contact determination signal.

In performing fingerprint detection after a predetermined period has elapsed in Step S1-1 of FIG. 8, the system controller 132 begins a regular image reading operation when the fingerprint detection pulse of FIG. 9(A) rises, and generates an image hold signal of FIG. 9(B). The image sensor 122, receiving the image hold signal, resets the charge stored in the photodiode array 201 in synchronization with the rising pulse t11 of the image hold signal shown in FIG. 9(B) and stores background image data (BK) in the photodiode array 201 during a period between pulse rising time t11 and the pulse rising time t12 of the next image hold signal.

Then, the background image data (BK) stored in the photodiode array 201 are transferred to the image storage device array 203 in synchronization with the pulse rise time t12 of the image hold signal. Then, the charge stored in the photodiode array 201 is reset.

The system controller 132 outputs an illumination control signal that rises at a timing t13 for controlling the driver 133 to light the light emitting diode 112. By lighting the light emitting diode 112, the light of the light emitting diode 112 becomes incident on the finger 101 and is reflected to the image guide 121. Accordingly, the light from the image guide 121 incident on the image sensor 122 increases. The image sensor 122 converts the light into charges (photo-electric conversion) in correspondence with the fingerprint of the finger 101 and stores the charges therein. The illumination control signal in this example drops at the timing t15, to thereby turn off the light emitting diode 112. The period of lighting the light emitting diode 112 is set beforehand in the system controller 132 (in this example, from t13 to t15).

The system controller 132 converts the charges stored in the image sensor 122 into voltage values from the timing t14 and allows voltage values to be supplied in the form of electric signals (analog signals) to the analog/digital converter 131 in synchronization with the image hold signal (system operation signal) of FIG. 9(B). The analog/digital converter (ADC) 131 converts the analog signals into digital image data. These digital image data are background image data (BK) stored in the image sensor 122 during the period between the pulse rise time t11 and the pulse rise time t12.

Likewise, electric signals corresponding to image data (SG) obtained by illumination by the light emitting diode 112 during the period between timing t17 and t18 are also supplied from the image sensor 122 to the analog/digital converter (ADC) 131.

In this example, a single finger contact detection operation is conducted in three consecutive scanning intervals. That is, although a regular operation of obtaining an image of a fingerprint is performed consecutively as shown in the diagram of FIG. 3, the finger detection operation is intermittently conducted in a predetermined period (e.g., once every 100 milliseconds). Thereby, power consumption can be reduced significantly.

It is to be noted that, in a case where imaging devices 142 positioned in the center and areas surrounding the center are used for conducting a finger detection operation, the light emitting diodes 112 positioned in the surrounding areas need not to be lit up, but only the light emitting diode 112 positioned in the center is lit up. Thereby, power consumption of the light emitting diodes 112 can be reduced to approximately ⅓ compared to the power consumed during a fingerprint detection operation.

From the aspect of reducing power consumption, it may be desirable that an image is obtained by the imaging devices 142 only when a finger contacts the image guide 121. Nevertheless, depending on the surface roughness of the image guide 121 or the angle of the tilted optical fibers of the image guide 121, an image may be obtained without any contact simply by positioning a finger in the vicinity of the surface of the fingerprint detection apparatus 100.

Although the image obtaining part 113 according to the above-described embodiment of the present invention includes the image guide 121 and the image sensor 122, the image obtaining part 113 may be configured without using the image guide 121. With this configuration, the distance between the finger and the imaging devices 142 can be measured without being affected by disturbance light.

By performing the operations conducted from t12 to t18, a single line of images can be obtained. Accordingly, by repeating the operations conducted from t12 to t18, plural lines of images can be obtained, so that an overall image can be acquired. More specifically, the overall image can be acquired by laterally sliding a finger against the first plane 121a of the image guide 121. In a case of obtaining an image having a resolution of 600 dpi where the interval (time interval) of the fingerprint detection pulse (scanning pulse) of FIG. 9(A) is 100μ seconds, the image can be sufficiently obtained at a finger sliding rate of 42.3 cm/sec (42.3 μm (pixel pitch in 600 dpi)÷100μ seconds). The interval of the fingerprint detection pulse (scanning pulse) during a normal fingerprint detection ranges from 100 μm seconds to 400μ seconds.

With the fingerprint detection apparatus according to the above-described embodiment of the present invention, no component dedicated to detect a finger is required owing to the fact that the fingerprint detection apparatus uses an image obtaining part for detecting a finger being in contact with or in the vicinity of the image obtaining part by referring to a difference between a image data signal (detection signal) and a background signal obtained when no finger is in the vicinity of the image obtaining part. Accordingly, with the above-described configuration and algorithm of the fingerprint detection apparatus of the present invention, a finger being contacting with or in the vicinity of the image obtaining part can be satisfactorily detected without having to use any additional component for finger detection.

Further, the present invention is not limited to these embodiments, but variations and modifications may be made without departing from the scope of the present invention.

The present application is based on Japanese Priority Application No. 2006-228168 filed on Aug. 24, 2006, with the Japanese Patent Office, the entire contents of which are hereby incorporated by reference.

What is claimed is:

1. A fingerprint detection apparatus for obtaining an image of a fingerprint of a finger by using a light source for emitting a light to the finger and an image obtaining part for outputting electric signals in correspondence with received light, the fingerprint detection apparatus comprising:

a system controller for determining whether the finger is in contact with or in the vicinity of the image obtaining part by comparing a threshold with a difference between a value of the electric signal when the light source is lit and a value of the electric signal when the light source is not lit;

wherein the system controller is adapted to set the threshold to at least a first value and a second value, higher than the first value, wherein the sensitivity for determining contact of a finger is lower when the threshold is set to said second value than when the threshold is set to said first value.

2. The fingerprint detection apparatus as claimed in claim 1, wherein the image obtaining part includes an image guide for guiding the received light and an image sensor for detecting the light guided from the image guide.

3. The finger print detection apparatus as claimed in claim 1, wherein the system controller intermittently determines whether the finger is in contact with or in the vicinity of the image obtaining part.

4. The fingerprint detection apparatus as claimed in claim 1, wherein the system controller switches from a finger detection system mode to a fingerprint image obtaining mode when determining that the finger is in contact with or in the vicinity of the image obtaining part.

* * * * *